United States Patent

Shuen

[19]

[11] Patent Number: 5,985,382
[45] Date of Patent: Nov. 16, 1999

[54] DECORATION ARTICLE MOUNTED TO AN AUTOMOBILE

[75] Inventor: Shun Tian Shuen, Taipei, Taiwan

[73] Assignee: Janchy Enterprise Co., Ltd., Taipei, Taiwan

[21] Appl. No.: 09/262,028

[22] Filed: Mar. 4, 1999

[51] Int. Cl.⁶ .................................................. B60R 13/00
[52] U.S. Cl. ................................ 428/31; 428/13; 428/14; 428/66.5; 428/67; 428/99; 428/542.2; 280/727; 40/591
[58] Field of Search ............................ 428/13, 67, 542.2, 428/14, 66.5, 66.6, 99, 31; 280/727; 40/591

[56] References Cited

U.S. PATENT DOCUMENTS

| | | | |
|---|---|---|---|
| 5,078,453 | 1/1992 | Siwek | 301/37 R |
| 5,413,826 | 5/1995 | Klonikowski | 428/31 |
| 5,456,958 | 10/1995 | Crisler | 428/31 |
| 5,480,688 | 1/1996 | Kaumeyer | 428/13 |

*Primary Examiner*—Deborah Jones
*Assistant Examiner*—Abraham Bahta
*Attorney, Agent, or Firm*—Browdy and Neimark

[57] ABSTRACT

A decoration article for use on automobiles is made up of a decoration top cap, a round disc and a double-sided adhesive piece. The round disc conforming identically to the structure of the double-sided adhesive piece has a central engaging protrusion for the passage of a screw and a square hole adjacent the central protrusion for water to be discharged therethrough when mounted to a water discharge spout of a windshield system. The decoration top cap is provided with a recess on the peripheral wall thereof so as to permit water to be discharged via the recess. The double-sided adhesive piece enables the decoration piece to be attached to the engine hood or trunk lid of a vehicle and the screw or bolt permits the decoration article to be firmly fixed to an outer lid of a wheel for ornament purpose.

6 Claims, 5 Drawing Sheets

DECORATION ARTICLE MOUNTED TO AN AUTOMOBILE

BACKGROUND OF THE INVENTION

The present invention relates to a decoration article for use on automobiles, which is made up of a replaceable decoration top cap provided with artistic design, a round disc and a double-sided adhesive piece. The round disc conforming identically to the structure of the double-sided adhesive piece has a central protrusion for the passage of a screw and a square hole adjacent the central protrusion for water to pass when mounted to a water discharge spout of a windshield wiper system of a vehicle. The decoration top cap is provided with a recess on the peripheral wall thereof so as to permit water to be discharged via the recess. The double-sided adhesive piece enables the decoration piece to be attached to the engine hood or trunk lid of a vehicle and the screw or bolt permits the decoration article to be firmly fixed to an outer lid of a wheel for ornament purpose.

The decoration article of the present invention is mounted to a water discharge spout of a windshield wiper system or an outer lid of a wheel of an automobile and various decoration top caps can be selectively replaced according to individual preference.

To decorate an automobile, bumper stickers and artistic stickers ore attached to the engine hood, windows and trunk lid. Such colorful decoration stickers of various designs are selected according to individual preference. They are no serious disadvantages in the prior art decoration articles, but there are still some room for provision of improved decoration articles that can be selectively replaced with ease.

SUMMARY OF THE INVENTION

The primary object of the present invention is to provide a decoration article that is simple in structure and easy to mount to an automobile.

Another object of the present invention is to provide a decoration article that is provided with decoration top caps for easy replacement so as to permit a person to select various decoration top cap according to individual preference.

One further object of the present invention is to provide a decoration article that can be mounted to a water discharge spout of a windshield wiper system without influence the normal water discharge operation of the wiper system. Or it can be mounted to an engine hood, trunk lid or the outer lids of wheels.

BRIEF DESCRIPTION OF THE DRAWINGS

FIGS. 4A, 4B, 4C, 4D are diagrams showing the various top caps of the decoration articles of the present invention.

DETAILED DESCRIPTION OF THE EMBODIMENT

Figure 1:
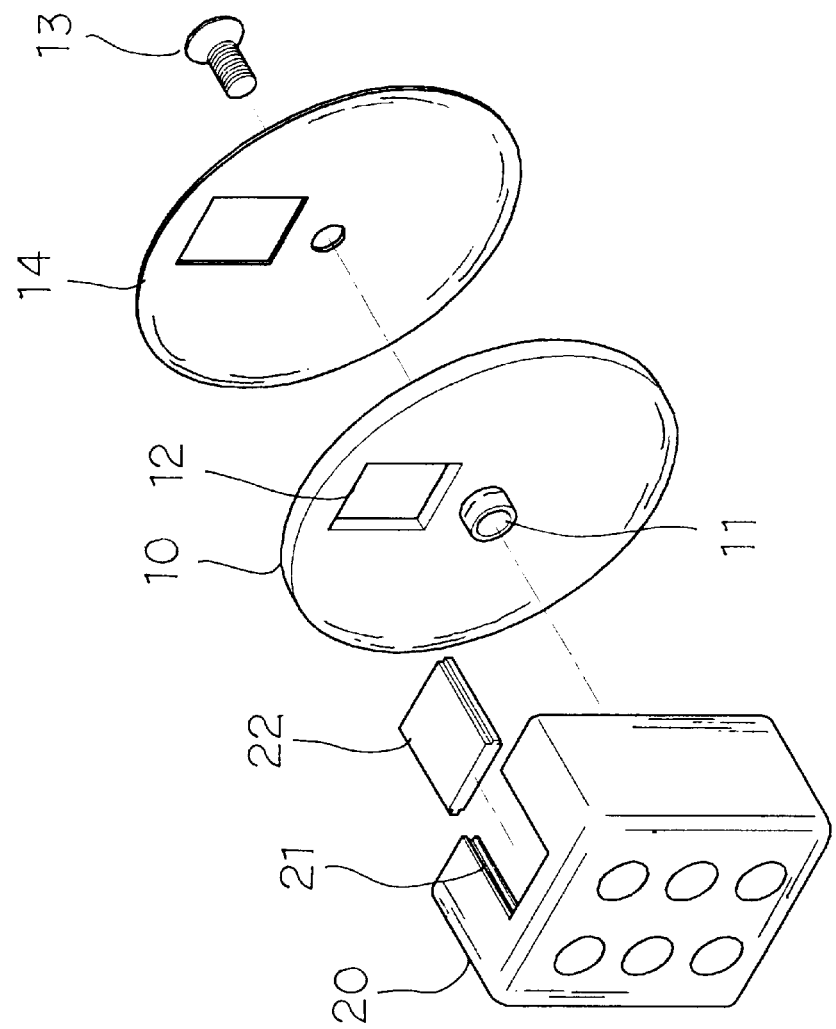
FIG. 1 is a perspective diagram showing the exploded components of the first embodiment of the present invention.
Figure 2:
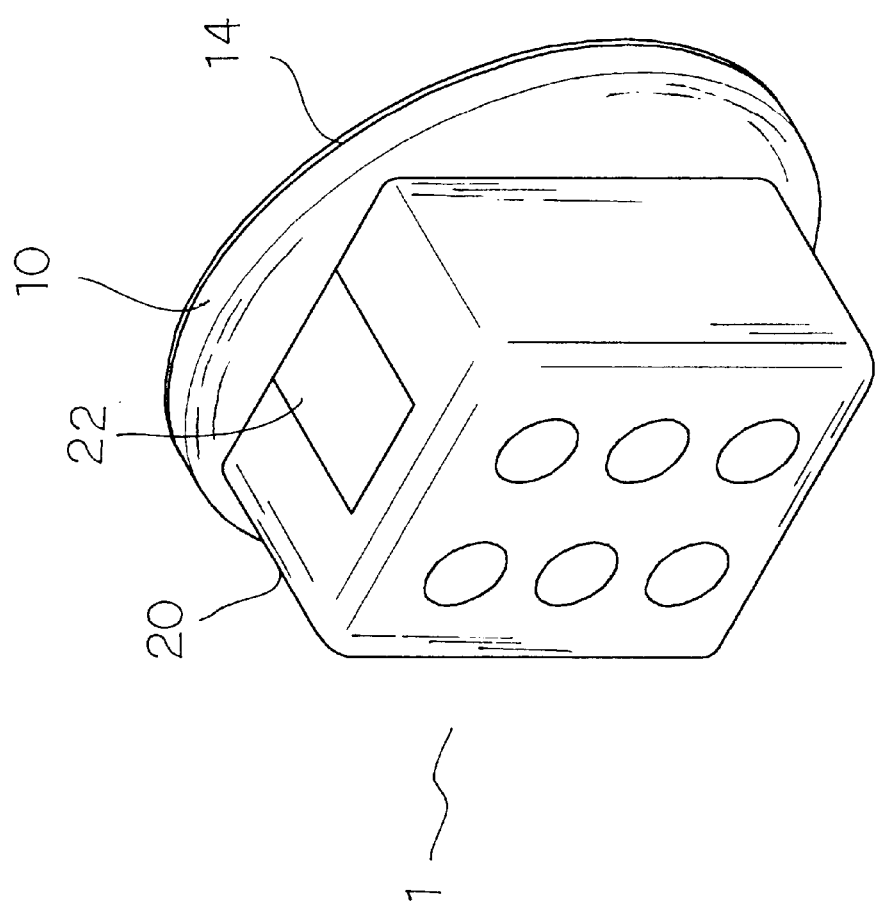
FIG. 2 is a perspective diagram showing the assembly of the decoration article of the present invention.

Referring to FIGS. 1, 2, the decoration article 1 of the present invention mainly is comprised of a round disc 10 and a decoration top cap 20. The round disc 10 is a circular flat plate having a tubular engaging protrusion 11 at the center thereof and a square hole 12 adjacent the central engaging protrusion 11.

A double-sided adhesive piece 14 is secured to one side of the round disc 10. The decoration top cap 20 can be designed in various shapes and provided with different artistic marks thereon. On the interior of the decoration top cap 20 is provided with a tubular projection (not shown) in correspondence to the central engaging protrusion 11 so as to permit the decoration top cap 20 to be integrally fixed to the round disc 10 by a screw 13. The decoration top cap 20 has a recess 21 on one peripheral wall thereof and a removable lid 22 is engaged with the recess 21.

When the decoration article 1 is mounted onto an automobile at a water discharge spout of the windshield wiper thereof, the removable lid 22 is separated from the decoration top cap 20, permit water received in a tank to be discharged from the spouts of the windshield wiper system.

Figure 3:
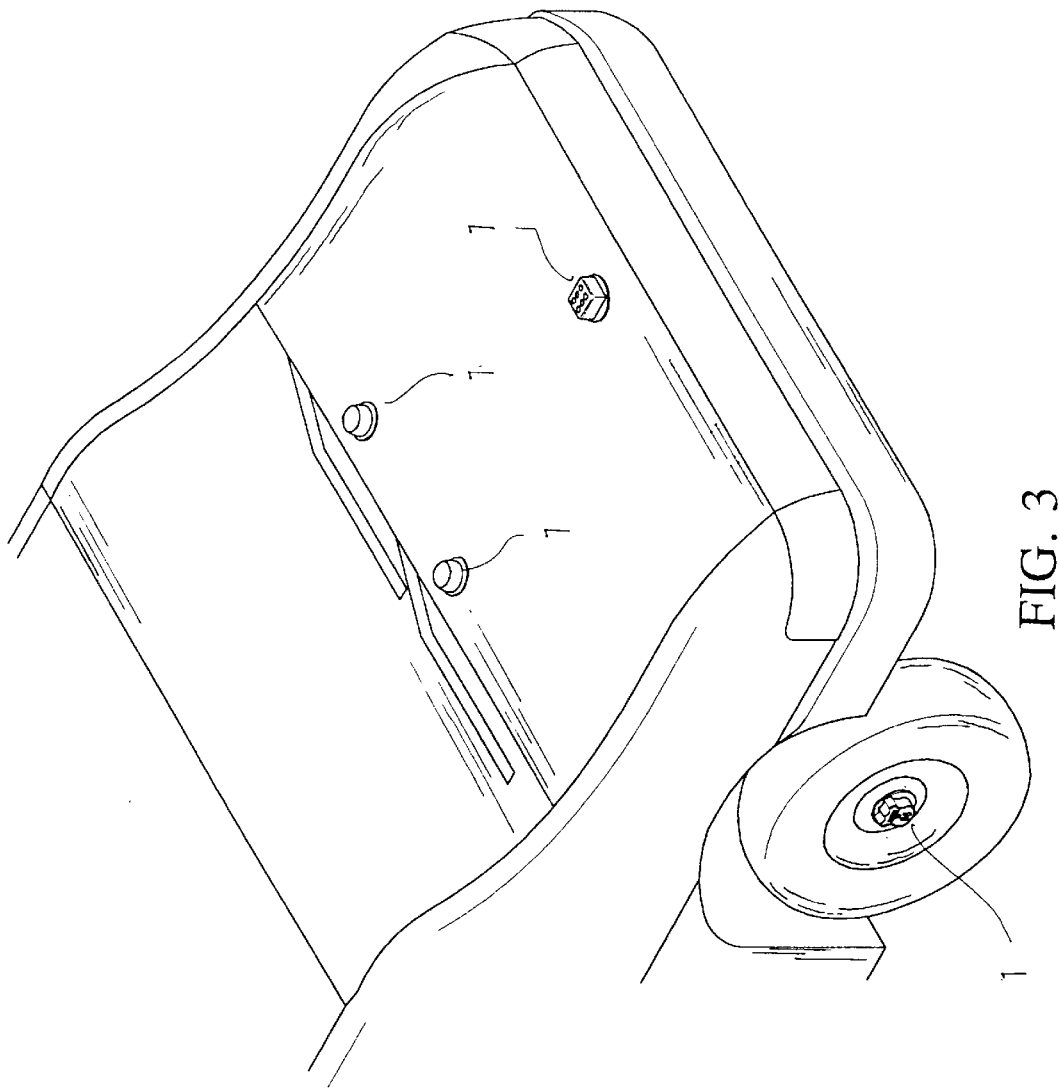
FIG. 3 is a diagram showing the decoration articles of the present invention mounted onto an automobile.
Figure 4:
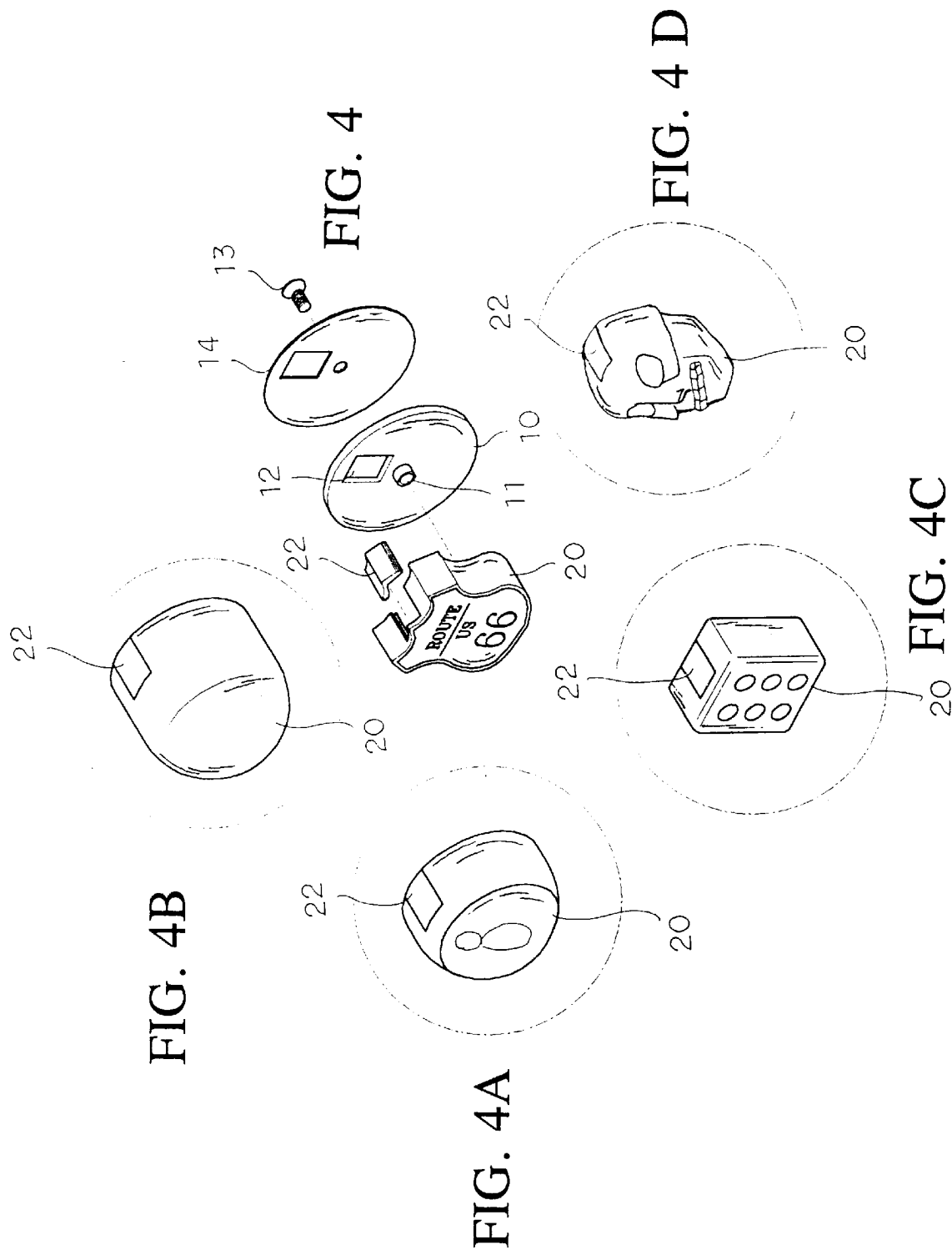
FIG. 4 is a perspective diagram showing the exploded components of the second embodiment of the present invention.

The double-sided adhesive piece 14 attached to the back side of the round disc 10 enables the decoration article 1 to be fixed to the surface of an engine hood at a discharge spout of a windshield wiper system. To permit water to be discharged out of the decoration article 1, the removable lid 22 is taken apart from the decoration article 1, as shown in FIG. 3.

Referring to FIG. 4, and FIGS. 4A, 4B, 4C, 4D, multiple decoration top caps 20 are designed to be selectively engaged with the round disc 10 by way of the screw 13 led through the central protrusion 11. It makes the replacement of the top caps 20 in an easy and convenient manner.

Figure 5:
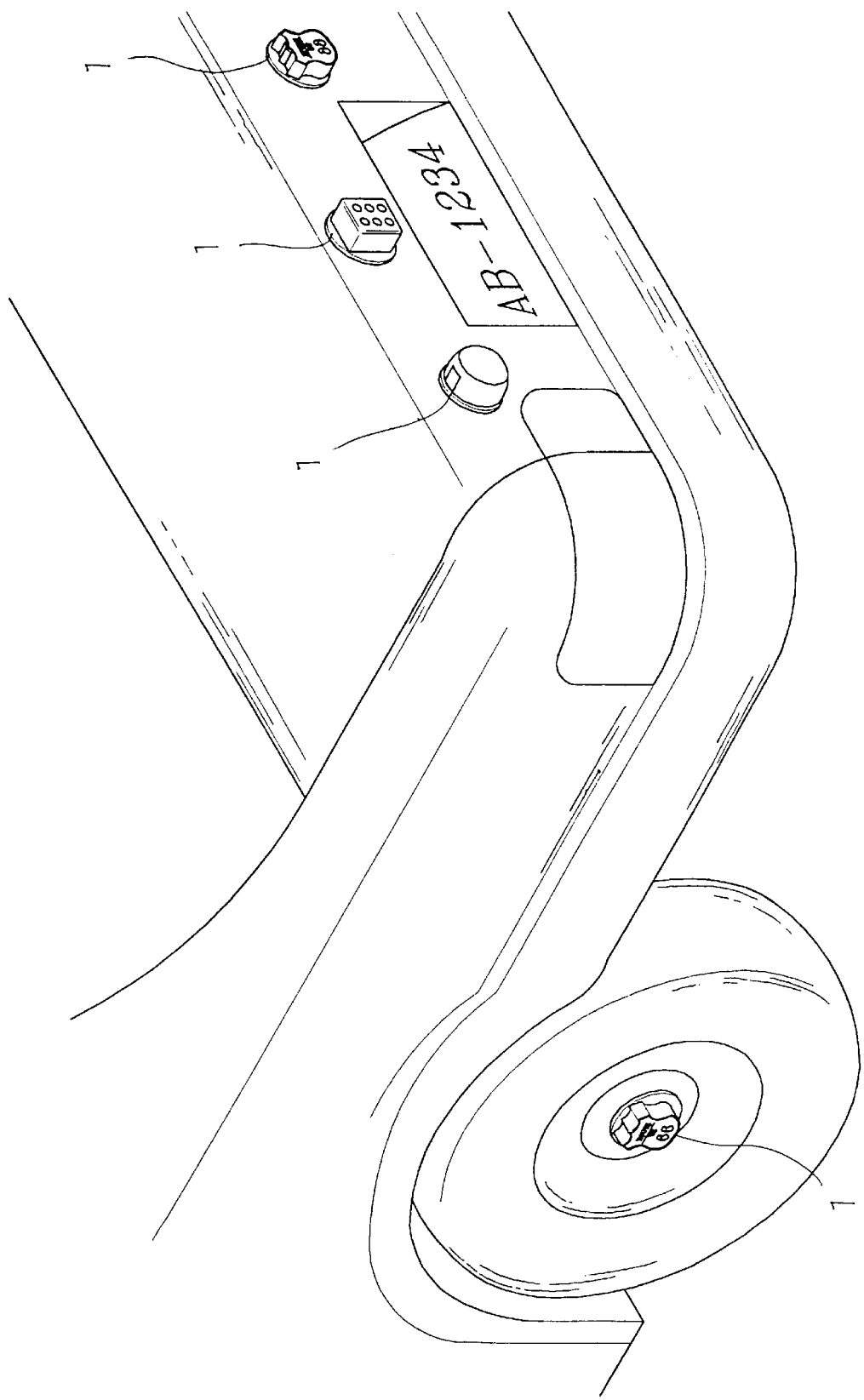
FIG. 5 is a partial perspective view of the front of a car to which a decoration article of the present invention is mounted.

In addition, the decoration article 1 can be mounted to the center of an outer lid of a wheel or to the two front corners of the engine hood to serve as a distance-measuring device. It can help a driver drive with care, preventing a vehicle from accidental collision in operation. The decoration articles can be either secured in place by the double-sided adhesive piece 14 or is fixed by a long bolt, which is a substitute of the screw 13. The bolt is led through an outer lid of a wheel and the round disc 10 to engage with the decoration top cap 20 so as to firmly fix the decoration article 1 to a wheel lid. The decoration articles can also be fixed to the trunk lid, as shown in FIG. 5.

The above cited embodiments are only examples of the present invention not for limiting the scope thereof but for demonstration purpose only. Any modifications, changes, amendments and equivalents thereof should all be fallen into the scope of the claims described as follows.

I claim:

1. A decoration article for use on an automobile, comprising:
    a round disc;
    a decoration top cap provided with an artistic design;
    said round disc and said decoration top cap being separably engaged with each other as a whole by a retaining means;
    a fixing means engaged with said round disc being used to secure said decoration article to an engine hood, a trunk lid or an outer lid of a wheel.

2. The decoration article as chimed in claim 1 wherein said fixing means is a double-sided adhesive piece having one side thereof attached to said round disc and the other side thereof attached a surface of an engine hood or trunk lid.

3. The decoration article as claimed in claim 1 wherein said fixing means is a bolt which is used to secure said round disc and said decoration top cap to an outer lid of a wheel of an automobile.

4. The decoration article as claimed in claim 1 wherein said retaining means to engage said round disc with said decoration top cap is a screw.

5. A decoration article for use on an automobile, comprising:

- a round disc;
- a replaceable decoration top cap provided with artistic design;
- a double-sided adhesive piece shaped in conformance to said round disc being attached to one side of said round disc;
- said round disc having a central tubular protrusion and a hole adjacent the central protrusion;
- said decoration top cap having an internal central protrusion in correspondence to said tubular protrusion of said round disc being separably engaged with said round disc by a screw or bolt;
- said decoration top cap having a recess on a peripheral wall thereof so as to permit water to be discharged therethrough;
- a removable lid engaged with said recess of said decoration top cap being selectively registered with said top cap;
- said double-sided adhesive piece in integration with said round disc and said decoration top cap being fixed to an engine hood around a water discharge spout of a windshield wiper system of an automobile with said hole of said round disc registered with said water discharge spout of said windshield wiper system so as to permit water to be discharged through said hole;
- said removable lid of said decoration top cap being taken away from said recess so as to permit water to be discharged from said top cap via said recess when said decoration article being registered to a water discharge spout of a windshield wiper system.

6. The decoration article as claimed in claim 5 wherein said round disc and said decoration top cap are integrally bound together by a bolt which is led through a hole on an outer lid of a wheel of a vehicle.

* * * * *